S. E. SOUTHLAND.
Cattle Stanchion.
No. 35,331.  Patented May 20, 1862.
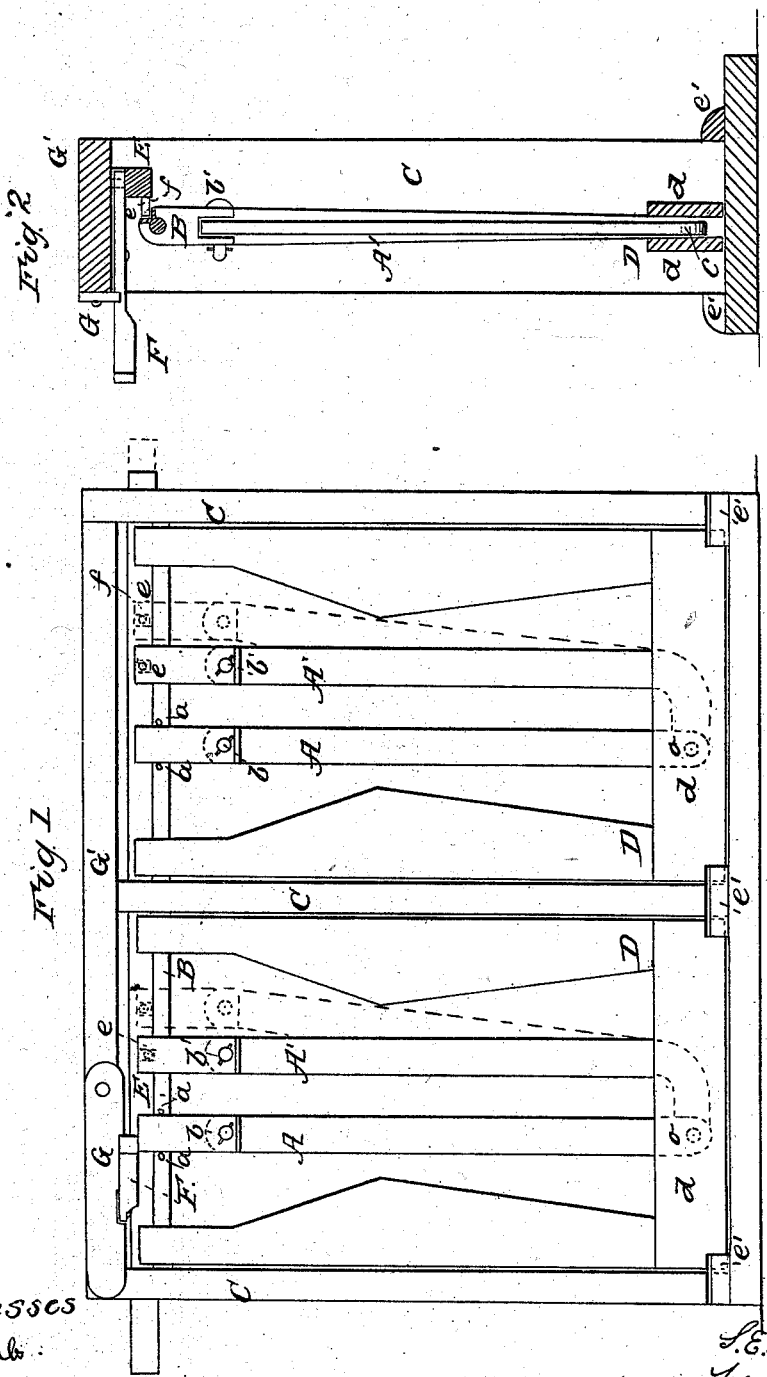

UNITED STATES PATENT OFFICE.

S. E. SOUTHLAND, OF JAMESTOWN, NEW YORK.

IMPROVED DEVICE FOR FASTENING CATTLE.

Specification forming part of Letters Patent No. 35,331, dated May 20, 1862.

*To all whom it may concern:*

Be it known that I, S. E. SOUTHLAND, of Jamestown, in the county of Chatauqua and State of New York, have invented a new and Improved Device for Fastening Cattle; and I do hereby declare that the following is a full, clear, and exact description of the same, reference being had to the accompanying drawings, forming a part of this specification, in which—

Figure 1 represents a front elevation of my invention, showing the neck-bars in different positions. Fig. 2 is a transverse vertical section of the same.

Similar letters of reference in both views indicate corresponding parts.

The object of this invention is to arrange the means employed for fastening and unfastening cattle in such a manner that by a single movement a whole series of cattle can be fastened or unfastened simultaneously, leaving the cattle free at the same time to move their heads in either direction or to lie down and get up without difficulty.

This invention consists in the arrangement of two neck-bars or stanchions on a suspended frame so constructed as to swing forward and back; also in the arrangement of two neck-bars, each made of two parts connected together by pivots, and attached to each other by means of a hinged joint, in combination with a round bar from which said neck-bars are suspended, and to which one of the same is attached, so that it is prevented from moving in a longitudinal direction, whereas the other is free to slide on said suspension-rod toward and from the said neck-bar in such a manner that by drawing the upper ends of the neck-bars together on the neck of an animal said animal is secured, and by opening the neck-bars the animal is released, and that the animals when fastened by this device are free to move their heads up and down or sidewise in either direction.

It consists, further, in the arrangement of a longitudinally-sliding bar in combination with a series of neck-bars suspended from a rod and arranged, as previously described, in such a manner that by the motion of said sliding bar the neck-bars are closed or opened and a number of cattle fastened or unfastened by one motion.

To enable those skilled in the art to make and use my invention, I will proceed to describe it.

A A' are the neck-bars, which are suspended from a rod, B. Said rod is firmly secured in the uprights C, and the neck-bars swing on the same quite freely. The neck-bar A is prevented sliding on the rod in a direction parallel to its axis by two pins or studs $a$; but the neck-bar A' is free to move on said rod between the limits prescribed by the frame D, which is also suspended from the rod B, or any other suitable device. Said frame swings freely backward and forward, so that an animal fastened in the same by means of the neck-bars A A' can lie down or get up without difficulty. Each of the neck-bars is made of two parts, which are connected together by pivots $b$ $b'$, so that the same are free to swing in a plane passing through the axis of the rod B, and the lower ends of said neck-bars are attached to each other by a joint, $c$, so that the neck-bar A' is permitted to assume a position shown in red outlines in Fig. 1, or to be brought in a position parallel to neck-bar A, as shown in black outlines in the same figure. The lower ends of the neck-bars are confined between the lower cross-bars, $d$, of the frame D, and stops $e$, placed on either side of said frame at a certain distance apart, confine the swinging motion of the neck-bars and frame around the rod B between certain limits.

If it is desired to secure an animal between the neck-bars A A', the neck-bar A' is pushed back to the position shown in red outlines in Fig. 1, and the animal is made to pass its head through between said bars. The neck-bar A' is now brought back to its original position parallel with the neck-bar A and secured, and the animal is confined between the two neck-bars in the most convenient manner. It can move its head up and down quite freely, it can lie down or move sidewise in either direction between the prescribed limits, and it can be released simply by opening the neck-bars.

In places where a number of cattle are to be fastened in the same building the rod B continues from one end of the building to the other, and a series of frames, D, with neck-bars A A', are suspended from the same, precisely as hereinbefore described. Each of the neck-bars A' is provided with a notch, e, to receive a stud, f, projecting from the side of a bar, E, which slides in the uprights C in a direction parallel to the suspension-rod B. By imparting a longitudinally-sliding motion to the bar E, therefore, the neck-bars A' are opened or closed simultaneously, and the studs f are so arranged that they do not interfere with the swinging motion of the neck-bars A A' or frames D. The sliding bar E is operated by a hand-lever, F, which is pivoted to the under side of a cross-bar, G', secured to the upper ends of uprights C, or to any other convenient spot in the building. A notched catch, G, dropping over the hand-lever F, retains the same when the neck-bars are closed. A series of cattle can thus be fastened or unfastened simultaneously simply by imparting to the bar E a longitudinally-sliding motion.

Having thus fully described my invention, what I claim as new, and desire to secure by Letters Patent, is—

1. The arrangement of the suspended swinging frame D, so constructed by means of hinged joints, or their equivalents, as to swing forward and back, in combination with neck-bars A A', or their equivalents, constructed and operating substantially as and for the purpose herein set forth.

2. The neck-bars A A', connected at the bottom by a pivot, c, or its equivalent, and so constructed as to open and close and to swing forward and back and right and left, substantially in the manner and for the purpose herein shown and described.

3. The arrangement of the longitudinally-sliding bar E, in combination with the swinging neck-bars A A', constructed and operating substantially as and for the purpose specified.

S. E. SOUTHLAND.

Witnesses:
J. SOUTHLAND,
J. F. SOUTHLAND.